(12) United States Patent
Neef

(10) Patent No.: US 10,981,098 B2
(45) Date of Patent: Apr. 20, 2021

(54) AIR FILTER ELEMENT, IN PARTICULAR FOR GAS FILTRATION

(71) Applicant: MANN+HUMMEL GmbH, Ludwigsburg (DE)

(72) Inventor: Pascal Neef, Leonberg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 194 days.

(21) Appl. No.: 16/386,360

(22) Filed: Apr. 17, 2019

(65) Prior Publication Data
US 2019/0308124 A1    Oct. 10, 2019

Related U.S. Application Data

(63) Continuation of application No. PCT/EP2017/076233, filed on Oct. 13, 2017.

(30) Foreign Application Priority Data

Oct. 17, 2016   (DE) .......................... 102016012327.3

(51) Int. Cl.
*B01D 46/24*    (2006.01)
*B01D 46/00*    (2006.01)
(Continued)

(52) U.S. Cl.
CPC ......... *B01D 46/2414* (2013.01); *B01D 27/06* (2013.01); *B01D 27/08* (2013.01);
(Continued)

(58) Field of Classification Search
CPC .............. B01D 46/2414; B01D 46/106; B01D 2275/201; B01D 2275/206;
(Continued)

(56) References Cited

U.S. PATENT DOCUMENTS

| 6,059,851 A | 5/2000 | DePietro, III et al. |
| 2005/0120686 A1 | 6/2005 | Nakagome et al. |

(Continued)

FOREIGN PATENT DOCUMENTS

| DE | 102009013529 A1 | 10/2009 |
| DE | 102011011595 A1 | 8/2012 |

(Continued)

*Primary Examiner* — Robert Clemente
(74) *Attorney, Agent, or Firm* — James Hasselbeck

(57) ABSTRACT

An air filter element has a filter medium body that has a wall to be flowed through by a fluid to be purified in a radial direction relative to a longitudinal axis of the filter medium body. The filter medium body has a first end face and an oppositely positioned second end face. The filter medium body has an elongate cross section shape with two oppositely positioned narrow sides and two oppositely positioned long sides connecting the two narrow sides. A cross section surface of the filter medium body tapers from the first end face toward the second end face. The two long sides each have an inwardly oriented radial constriction in a region of the narrow second end face, wherein, in a region of the first end face, the two long sides are formed without or at least approximately without the inwardly oriented radial constriction, respectively.

25 Claims, 8 Drawing Sheets

(51) Int. Cl.
*B01D 46/52* (2006.01)
*F02M 35/024* (2006.01)
*B01D 46/10* (2006.01)
*F02M 35/02* (2006.01)
*B01D 35/30* (2006.01)
*B01D 27/06* (2006.01)
*B01D 27/08* (2006.01)

(52) U.S. Cl.
CPC ......... *B01D 35/30* (2013.01); *B01D 46/0005* (2013.01); *B01D 46/106* (2013.01); *B01D 46/24* (2013.01); *B01D 46/2411* (2013.01); *B01D 46/52* (2013.01); *B01D 46/521* (2013.01); *F02M 35/0201* (2013.01); *F02M 35/024* (2013.01); *F02M 35/0245* (2013.01); *F02M 35/02416* (2013.01); *F02M 35/02433* (2013.01); *F02M 35/02483* (2013.01); *B01D 2275/201* (2013.01); *B01D 2275/206* (2013.01); *B01D 2275/208* (2013.01)

(58) Field of Classification Search
CPC ......... B01D 2275/208; B01D 46/2411; B01D 46/0005; B01D 35/30; B01D 27/06; B01D 27/08; F02M 35/0201; F02M 35/02416; F02M 35/0245; F02M 35/02483

See application file for complete search history.

(56) References Cited

U.S. PATENT DOCUMENTS

| | | |
|---|---|---|
| 2007/0157589 A1 | 7/2007 | Haberkamp et al. |
| 2015/0343359 A1* | 12/2015 | Neef .................... B01D 46/008 55/495 |
| 2016/0166952 A1 | 6/2016 | Hahn et al. |

FOREIGN PATENT DOCUMENTS

| | | |
|---|---|---|
| DE | 102013002057 B4 | 7/2014 |
| EP | 2616157 A1 | 3/2012 |
| EP | 2675546 A1 | 8/2012 |
| FR | 2214505 A1 | 8/1974 |
| JP | 2009113015 A | 5/2009 |

* cited by examiner

AIR FILTER ELEMENT, IN PARTICULAR FOR GAS FILTRATION

CROSS-REFERENCE TO RELATED APPLICATIONS

This application is a continuation application of international application No. PCT/EP2017/076233 having an international filing date of 13 Oct. 2017 and designating the United States, the international application claiming a priority date of 17 Oct. 2016 based on prior filed German patent application No. DE102016012327.3, the entire contents of the aforesaid international application and the aforesaid German patent application being incorporated herein by reference.

BACKGROUND OF THE INVENTION

The invention concerns an air filter element, in particular round (air) filter element, in particular for gas filtration, e.g. for use in the intake manifold of an internal combustion engine, with a filter medium body embodied as a folded filter and annularly closed, whose wall can be flowed through by the fluid to be purified in radial direction relative to the longitudinal axis of the filter medium body, wherein the filter medium body comprises an elongate cross section shape with two oppositely positioned narrow sides and two oppositely positioned long sides connecting the two narrow sides.

DE 10 2004 053 118 A1 discloses an air filter device for an internal combustion engine that comprises a hollow cylindrical filter element in a filter housing, wherein the filter element is flowed through by the air to be purified in radial direction from the interior to the exterior. The air is guided through an open axial end face into the interior of a filter medium body of the filter element and flows through the wall of the filter medium body in radial direction from the interior to the exterior. Subsequently, the purified air is discharged through an outlet socket from the air filter device.

The filter element is placed onto an inlet socket which is located at the bottom of the filter housing and projects into the interior of the filter element in the mounted state. The incoming air flows through the inlet socket axially into the interior of the filter element and is subsequently deflected in radial direction for flow through the filter medium body.

DE 10 2011 011 595 A1 discloses a filter element for air filtration whose filter medium body is embodied circumferentially in an annular shape and surrounds an inwardly positioned flow space into which the raw fluid to be purified is introduced in axial direction. The filter medium body which is flowed through in radial direction from the interior to the exterior by the fluid comprises an elongate cross section shape with semicircular narrow sides and concavely inwardly oriented long sides. The filter medium body comprises across its axial height a constant unchanged cross section shape.

SUMMARY OF THE INVENTION

The invention has the object to embody an air filter element, in particular a round filter element, preferably a round air filter element with an elongate filter medium body, with simple constructive measures in such a way that, while providing compact dimensions, a high filtration efficiency is ensured.

This object is solved according to the invention in that the cross section surface of the filter medium body tapers from one end face to the oppositely positioned end face and the filter medium body comprises at both its long sides a radially inwardly oriented constriction, respectively, in the region of the narrow end face, wherein, in the region of the oppositely positioned larger end face, the two long sides of the filter medium body are formed without or at least approximately without radial constriction.

The dependent claims provide expedient further developments.

The air filter element and/or round filter element according to the invention is preferably used for gas filtration, for example, for filtration of air, in particular in the intake manifold of an internal combustion engine of a vehicle. The filter element comprises an annularly closed filter medium body whose wall is flowed through by the fluid to be purified in radial direction. The filter medium body surrounds an inwardly positioned flow space which is delimited by the inner wall of the filter medium body, wherein the inner wall is the raw side. The fluid to be purified is introduced axially into the inwardly positioned flow space and flows through the wall of the filter medium body in radial direction relative to its longitudinal axis. The outer side of the filter medium body forms the clean side through which the purified fluid exits from the wall of the filter medium body. Flow from the exterior to the interior would also be conceivable however. The axial end faces of the filter medium body are covered by end disks in a flow-tight manner. For axial flow conveyance of the fluid, one end disk comprises a central opening that is communicating with the inwardly positioned flow space; however, the oppositely positioned end disk is embodied in a closed configuration and closes off the inwardly positioned flow space outwardly in axial direction.

Expediently, the end disk of the filter element provided with the central opening (open end disk) is embodied at its radial inner side so as to be rounded so that inflow of the raw air into the interior in the filter medium body is facilitated. The radius of the rounded portion is advantageously greater at the radial inner side of the end disk than at the radial outer side. As needed, the radius at the radial inner side is realized to be so large that the starting point of the radius at the end face is still located within the contour of the filter medium body.

The filter element and the filter medium body are embodied with an elongate shape and comprise an oval or ovalized cross section shape. The cross section shape provides preferably two oppositely positioned narrow sides and two oppositely positioned long sides that connect the narrow sides. The elongate cross section shape comprises, for example, a cross section shape with substantially parallel long sides (can also be referred to as longitudinal sides) and in particular semicircular narrow sides. The long sides have a smaller curvature than the narrow sides so that an oval, preferably axis-symmetrical, cross section results. Preferably, the diameter of the filter medium body in the direction of the major axis (substantially parallel to the long sides, i.e., the maximal diameter of the filter medium body) is at least twice, preferably three times, as large as the diameter in the direction of the minor axis that is perpendicular to the major axis (perpendicular to the long sides, i.e., the minimal diameter of the filter medium body). This makes it apparent that preferably the cross section of the filter medium body has a shape similar to a flattened circle so that an elliptical cross section results whose circumference however must not necessarily be continuous or smooth in a narrow geometric sense of an ellipse. Preferably, the inner wall and the outer wall of the filter medium body extend concentric to each other so that the filter medium body has a constant radial thickness.

The filter element comprises preferably a cross section shape that tapers in axial direction so that the outer circumference of the round filter element in the region of the first end disk is differently sized in comparison to the outer circumference of the round filter element in the region of the oppositely positioned second end disk. In this case, one can speak of an oval conical round filter element. In the region of both end disks, the round filter element comprises an oval or ovalized elongate cross section shape, respectively.

In case of the tapering cross section shape of the filter element, the end disk at the end face with smaller outer circumference can be of a closed configuration and can axially close off the inwardly positioned flow space, while the oppositely positioned end disk at the larger outer circumference comprises a flow opening for the fluid, in particular for introducing the raw fluid into the inwardly positioned flow space.

Preferably, the end disk at the end face with smaller outer circumference and/or the closed end disk, viewed in the direction of the long sides, comprises a smaller maximal diameter than the end disk with larger outer circumference and/or the open end disk. In this way, the available flow cross section that is available around the closed end disk can be enlarged. In this context, viewed in the direction of the long sides, the difference of the (maximal) diameter between open and closed end disks is preferably in the range of one to two fold heights. The spacing between a raw-side fold edge to a clean-side fold edge that is directly following along the extension of the filter medium denotes fold height.

Moreover, embodiments are also possible in which the end disk at the end face with larger outer circumference is of a closed configuration and axially closes off the inwardly positioned flow space, and the oppositely positioned end disk at the smaller outer circumference comprises a flow opening for introducing fluid into the inwardly positioned flow space.

In the region of its narrow end face, the filter medium body comprises at one of its long sides, preferably however at both of its long sides, a radially inwardly oriented concave constriction, respectively. In contrast thereto, the two long sides of the filter medium body in the region of the oppositely positioned larger end face are not embodied convex but instead, for example, concave, preferably straight or at least approximately straight. Correspondingly, the cross section surface of the filter medium body changes, beginning at the larger end face toward the narrow end face, in that the long sides of the filter medium body change from a slightly convex or at least approximately straight shape to a concave and radially inwardly oriented or radially inwardly curved shape. An important concept in this context is that the filter element is to be embodied such that at the clean side as well as at the raw side optimal flow cross sections in axial direction can be achieved, i.e., in particular flow cross sections as large as possible. In this way, the pressure loss which is caused by the filter element can be minimized. The larger end face of the filter medium body surrounds a flow opening, for which reason a concave constriction at this location, as it is provided at the narrow end face, would be disadvantageous. According to the invention, the long sides, the larger end face of the filter medium body, and preferably also the open end disk arranged thereat should therefore have at least a smaller concave constriction in comparison to the narrow end face, preferably however should be embodied substantially straight or slightly convex. Due to the concave constriction at the narrow end face which in particular is closed off by an end disk, the flow cross section existing thereat in the installed state between the outer circumference of the filter medium body and/or the end disk, on the one hand, and the inner wall of a housing receiving the filter element, on the other hand, can be enlarged in a pressure loss-favoring way, without having to reduce the filter surface area.

For the task of optimizing the flow resistance, it is particularly advantageous in this case that a filter element comprises an annularly closed (round) filter medium body with an elongate cross section shape that can be flowed through in radial direction, wherein the filter medium body preferably tapers from the first end face to the oppositely positioned second end face and comprises a radially inwardly oriented constriction at one or preferably both long sides in the region of the preferably narrow second end face that is in particular closed for axial flow, and, further preferred, comprises an at least smaller or no inwardly oriented constriction at the long sides at the oppositely positioned end face that is in particular open for axial flow.

In the region of the narrow end face of the filter medium body, the long sides are displaced in radial direction inwardly relative to an imaginary connecting line between the narrow sides, for example, in case of semicircular narrow sides. The imaginary connecting line between the oppositely positioned narrow sides therefore constitutes a maximal external line in the region of the narrow end face of the filter medium body relative to which the actual long side of the filter medium body in radial direction is inwardly displaced. In the region of the oppositely positioned larger end face, no such radial constrictions are formed, on the other hand.

The extension of the long side in the radial constriction can be embodied straight or non-straight. In case of a non-straight extension, a crowned, convexly outwardly oriented configuration in radial direction as well as a radially inwardly oriented concave configuration are conceivable wherein in any case the long side is displaced completely, or at least approximately, across its length inwardly in radial direction relative to an envelope at the narrow end face.

According to a further expedient embodiment, the two oppositely positioned constrictions at the long sides, viewed across their length, have a constant spacing relative to each other. In an alternative embodiment, the spacing is non-constant.

Moreover, it is expedient that the constriction which is oriented in radial direction inwardly extends across the entire long side. In an alternative embodiment, the radial constriction however extends along the long sides only across a partial length which however preferably amounts to at least 50% of the total long side, for example, at least 80% of the long side.

Viewed in axial direction, i.e., relative to the height of the filter medium body, the radially inwardly oriented constriction at the long sides preferably extends axially across at least half the height of the filter medium body, optionally across at least 60%, at least 70%, or at least 80%, of the height of the filter medium body. As needed, a height smaller than half the total height of the filter medium body is conceivable also.

The advantage of the radial constriction lies in an increased annular space between the outer side of the filter element and the inner wall of the receiving filter housing. The enlarged annular space improves the flow conditions of the fluid. In case of a radial flow through the filter element from the interior to the exterior, the annular space is positioned at the outwardly positioned clean side of the filter element and receives the purified fluid that is discharged through a discharge opening from the filter housing. The tapering cross section surface of the filter medium body from one end face to the opposite end face contributes to enlarging the annular space between the outer side of the filter element and the inner wall of the receiving filter housing. The radial constriction in the region of the narrow end face enlarges additionally the annular space.

At the outer wall of the filter medium body, the filter element comprises advantageously a support grid which is embodied in particular to be shape-stable. The support grid is, for example, embodied as a thermoplastic injection-molded part. Due to the flow through the filter medium body in radial direction from the interior to the exterior, the wall of the filter medium body is subjected to a pressure which is directed radially to the exterior and under which the wall has the tendency to curve outwardly. The support grid at the outer wall of the filter medium body prevents a deformation of the wall in radial direction outwardly and thus maintains the shape of the filter medium body during filtration so that a deformation is avoided. Correspondingly, the filter medium body maintains its original geometric configuration over a long operating period and the flow conditions during filtration of the fluid are maintained. Also, the filter medium body is provided at the outer side with a support action by the support grid so that the filter medium body is subjected to reduced loads and the risk of damage of the filter medium body is reduced. In a configuration for flow from the exterior to the interior, a support grid can be arranged alternatively or additionally at the inner wall in order to fulfill the aforementioned functions. Advantageously, at least one end face of the support grid, as needed, both end faces, are embedded in the end disks. The end disk is comprised preferably of a softer material than the support grid and a seal carrier at the filter element which receives a sealing element.

The filter medium body is preferably embodied as a zigzag-shape folded filter with a plurality of filter folds. The filter folds extend preferably in or approximately in radial direction and thus in flow direction and extend at the same time axially between the two end faces of the filter medium body. The folded filter is embodied to be annularly closed. Preferably, the filter medium body comprises a web-shaped filter medium, preferably a paper, further preferred a cellulose paper, which is preferably embodied for separating solid particles from air. The filter medium may comprise a fine fiber coating with fibers of an average diameter in the range of 50-2,000 nm. The filter medium is further preferably impregnated with a flame retardant material, preferably with an impregnation according to DIN 53 438-3 F1. The filter medium has preferably a permeability of 50-500 l/m²s, preferably 50-200 l/m²s, measured at 2 mbar (200 Pa), in particular according to DIN EN ISO 9237. The fold spacing, also called fold pitch, i.e., the spacing between adjacently positioned fold edges, is preferably in a range of 1 to 5 mm at locations of the filter body without substantially curvature.

In particular, precisely one filter medium body embodied as a round filter is arranged in the filter element.

According to a further advantageous embodiment, a shaped body is projecting into one end face of the filter medium body and additionally stabilizes the filter medium body and secures the filter folds in the desired position in the embodiment as a folded filter. In the embodiment with a tapering cross section surface, the shaped body is preferably located at the end face with reduced cross section surface. The shaped body can be embodied as one piece with the support grid at the filter medium body so that support forces, acting on the end face of the filter element with the shaped body, are distributed through the shaped body to the support grid and the end disk is thus relieved of support forces.

The outer contour of the shaped body corresponds advantageously to the outer contour and/or the inner contour of the filter medium body at its end face where the shaped body projects into the filter medium body. It can be expedient to connect the shaped body, at least over sections thereof, to the neighboring end disk, for example, provide on the shaped body a support sleeve which projects into the end disk. The end disk, into which one or a plurality of sections of the shaped body are projecting, is preferably of a closed configuration and seals the interior of the filter medium body in a flow-tight manner. As needed, the shaped body can taper in a wedge shape toward its free end face, whereby the manufacturing process of the filter element is simplified and supported. The shaped body is in particular embodied as an elongate body and extends between oppositely positioned sides of the support grid.

According to an advantageous embodiment, the filter element comprises a sealing element, in particular a circumferentially extending sealing ring, that is arranged on a seal carrier which is embodied separate from the end disk and is arranged adjacent to the end disk at the raw air side through which the unpurified fluid is introduced into the inwardly positioned flow space. The sealing element is positioned in this context axially and radially at a spacing relative to the neighboring nearest end disk. Through the sealing element, a flow-tight separation of the raw side from the clean side is realized. Due to the configuration of the seal carrier separate from the end disk, the end disk is not subjected to holding and sealing forces which are absorbed via the sealing element and the seal carrier in the installed situation of the filter element. The end disk remains thus unaffected by the holding and sealing forces. Due to the spacing of the sealing element and advantageously also of the seal carrier relative to the neighboring end disk in axial and radial directions, the seal carrier and the sealing element also have a spacing relative to the clean or outer side of the filter medium body so that the fluid can exit via the clean side of the filter body unhindered by the seal carrier and by the sealing element. The seal carrier is designed to be fluid-tight and connects advantageously the nearest end disk fluid-tightly with the sealing element.

The seal carrier is spaced apart axially from the end face of the neighboring nearest end disk. Relative to the total axial height of the filter element, the axial spacing is, for example, maximally 20% of the axial height or maximally 10% of the axial height.

According to preferred embodiment, the seal carrier is arranged at the support grid. In particular, a one-piece configuration of support grid and seal carrier is conceivable, which are preferably embodied as plastic components. The sealing and holding as well as supporting forces are absorbed correspondingly by the seal carrier and the support grid while the filter medium body is relieved of these forces.

According to a further advantageous embodiment, the seal carrier is configured as a circumferentially extending carrier wall which is extending at a spacing to the outwardly positioned wall surface of the filter medium body. The carrier wall extends in particular parallel to the outwardly positioned wall surface of the filter medium body. The sealing element is advantageously inserted into a receiving groove in the carrier wall, wherein the receiving groove is preferably located at or adjacent to an end face of the carrier wall. The position of the sealing element at the carrier wall is located at the end face of the carrier wall which is facing away from the nearest end disk.

In the mounted position, the seal carrier is supported advantageously at a housing component, for example, at an inwardly positioned shoulder in a filter housing base that receives the filter element and to which a housing cover can be attached.

An alternative sealing arrangement that is advantageous in particular in case of flow through the filter element from the exterior to the interior provides a radially acting sealing surface at the open end disk, preferably a sealing surface that is acting inwardly in radial direction. In this context, the sealing surface is preferably circular-cylindrical or oval-cylindrical and arranged to axially project away from the open end disk. In this context, it is preferred that an annular sealing bead is formed as one piece and in one working step together with an open end disk, for example, cast from polyurethane, so as to axially project away from an end face thereof and comprises at its radial inner side a radial sealing surface that is in particular circular-cylindrical or oval-cylindrical.

At the end face, in particular at the top side of the seal carrier, optionally knobs can be formed, advantageously at an axial spacing to the end face. These knobs have the function of a tolerance compensation and can compensate deviations of the seal carrier relative to a plane surface for attachment of the housing cover and/or attachment to the shoulder in the filter housing base. The knobs are, for example, of a rod-shaped configuration and are positioned parallel to the sidewall of the seal carrier. The rod-shaped knobs extend, for example, in radial direction. In the mounted position, the knobs are pressed into the material of the housing component and compensate in this way tolerance deviations.

According to a further expedient embodiment that relates preferably to a (round) filter element with a cross section shape which is tapering in axial direction, the smaller end disk comprises radially projecting support cams. Advantageously, these support cams project in radial direction no farther than the oppositely positioned end disk. Also, the seal carrier and the sealing element extend advantageously in radial direction maximally to the outer circumference of the larger end disk.

The support cams are positioned preferably at the long sides and are in particular arranged at the end disk, preferably at the smaller end disk, in particular embodied as one piece with the end disk and integrally formed thereon. However, it is also possible to arrange, in addition, one or a plurality of cams at the end disk at the narrow side. The cams project in radial direction past the end disk and support the filter element at the receiving filter housing in the mounted state.

A further aspect of the invention relates to a filter device with an afore described (round) filter element and with a filter housing for receiving the (round) filter element. The filter housing includes in particular also a housing cover which is attachable to the filter housing base in order to close off the receiving space in the filter housing base in which the filter element is inserted. In a preferred embodiment, the filter housing base has an at least approximately unchanged cross section surface across its height so that, in the region of the radial constriction at the filter medium body, a relatively large annular space between the outer side of the filter element and the inner wall of the receiving filter housing base is provided for receiving fluid.

The pressure loss of the filter device with a filter element according to the invention amounts to approximately 5 to 35 mbar for a flow rate in the inflow socket of 10 to 40 m/s.

Preferably, the separation efficiency of the filter element, when it exhibits a pressure increase of 20 mbar by loading with particles in the filter device in operation, is greater than 98%, preferably greater than 99.8%, in particular measured according to ISO 5011 with test dust according to ISO 1203-1.

According to a further advantageous embodiment, a preferably blade-shaped flow guiding rib is arranged at the inner side of the housing cover and assists in introducing the fluid flow into the inwardly positioned flow space and in uniform particle loading of the filter element during filtration of the fluid, in particular also for non-symmetrical or non-parallel flow conditions. The unpurified fluid is preferably guided from the exterior radially in the direction of the filter medium body and then impinges on the flow guiding rib at the inner side of the housing cover which influences the impacting fluid flow, for example, divides it into two and/or guides it axially in the direction of the inwardly positioned flow space inside the filter medium body.

Different configurations of the flow guiding rib are conceivable. The flow guiding rib is embodied either straight and positioned in a plane or, according to an alternative embodiment, is curved. The flow guiding rib in case of a straight configuration can extend in axial direction of the filter element so that the wall faces of the flow guiding rib extend parallel to the longitudinal axis of the filter element.

The flow guiding rib can project into the flow opening which is provided in the end disk of the filter element and through which the unpurified fluid is introduced into the inwardly positioned flow space inside the filter medium body.

According to a further expedient embodiment, a lateral inflow opening through which the unpurified fluid radially flows in is provided in the housing cover and is pointing in radial direction. The flow guiding rib can be arranged adjacent to this inflow opening in the housing cover. The flow guiding rib can be positioned in such a way that the end face of the flow guiding rib is facing the inflow opening in the housing cover. The fluid flow which is radially supplied through the housing cover impacts on the flow guiding rib and experiences a deflection in the direction toward the inwardly positioned flow space inside the filter medium body. The flow guiding rib and the inflow opening can be oriented at least approximately parallel.

Advantageously, a lateral inflow opening is also provided in the filter housing base of the filter housing for the fluid to be supplied wherein this inflow opening in the filter housing base and the lateral inflow opening in the housing cover in the mounted state lie on top of each other and form a continuous flow path for the supplied fluid.

According to a further expedient embodiment, a lateral outflow opening is provided in the filter housing base, which is oriented preferably in radial direction and through which the purified fluid flows out. It can be expedient that the outflow opening is oriented at least approximately parallel to the inflow opening as well as to the flow guiding rib.

According to a further expedient embodiment, the filter element in the installed state is projecting axially slightly past the end face of the filter housing base so that the removal of the filter element from the filter housing base, for example, for servicing purposes, is facilitated. The seal carrier with the sealing element is positioned at a small axial spacing relative to the projecting end face of the filter element and ensures the flow-tight separation between the outwardly positioned section of the filter element and the inwardly positioned section of the filter element received in the filter housing base.

BRIEF DESCRIPTION OF THE DRAWINGS

Further advantages and expedient embodiments can be taken from the additional claims, the figure description, and the drawings.

In the Figures, same components are provided with same reference characters.

DESCRIPTION OF PREFERRED EMBODIMENTS

Figure 1:
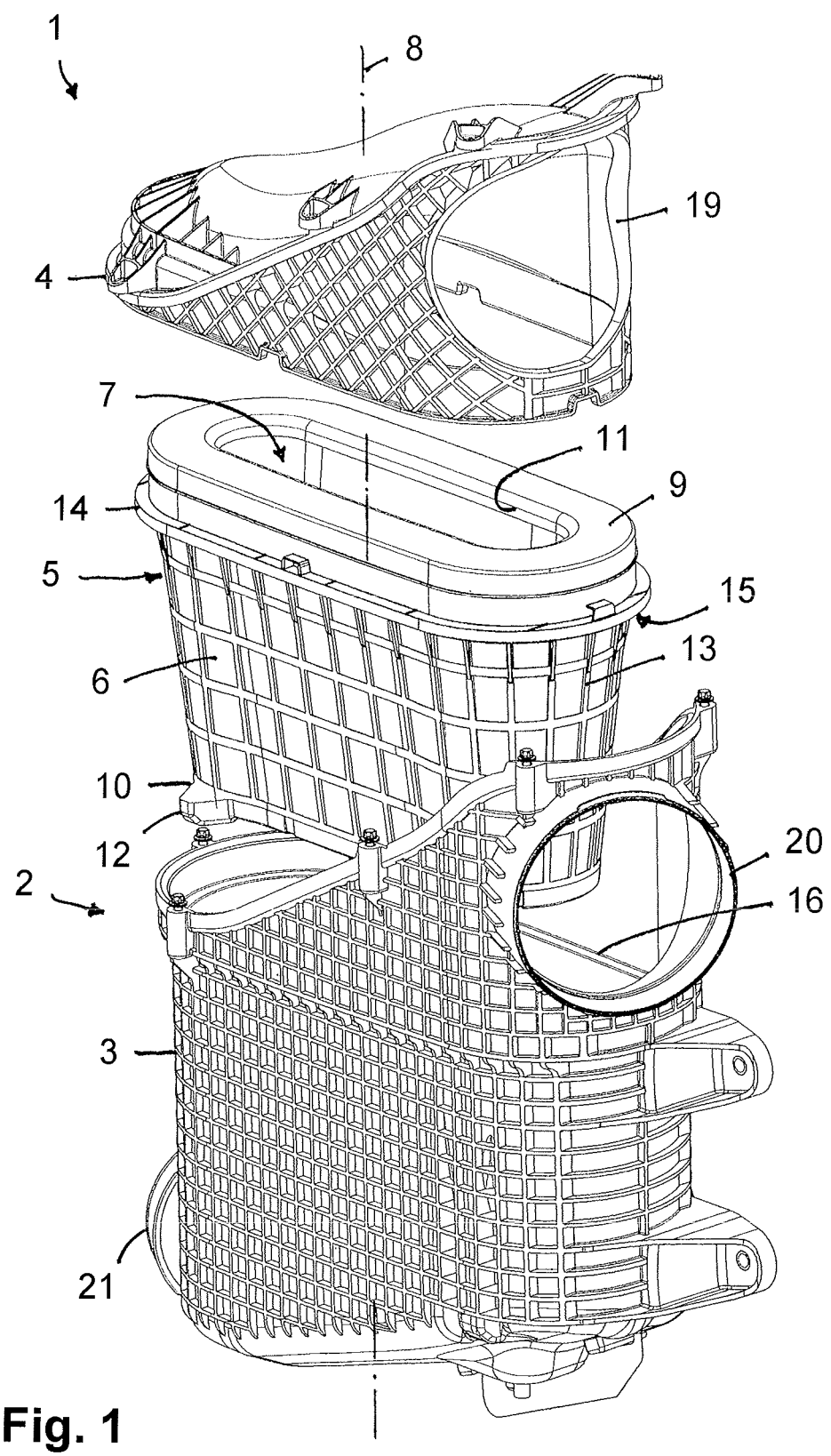
FIG. 1 shows in exploded illustration a filter device for gas filtration, with a filter housing base, a filter element, and a housing cover.

In the FIGS. 1, 2, 6, and 7, a filter device 1 is illustrated that preferably is utilized for gas filtration, in particular for air filtration in the intake manifold of an internal combustion engine. The filter device 1 comprises a filter housing 2 that is comprised of a filter housing base 3 and a housing cover 4, and a filter element 5 that is insertable into the filter housing base 3. The housing cover 4 closes off the receiving space inside the filter housing base for receiving the filter element 5.

Figure 3:
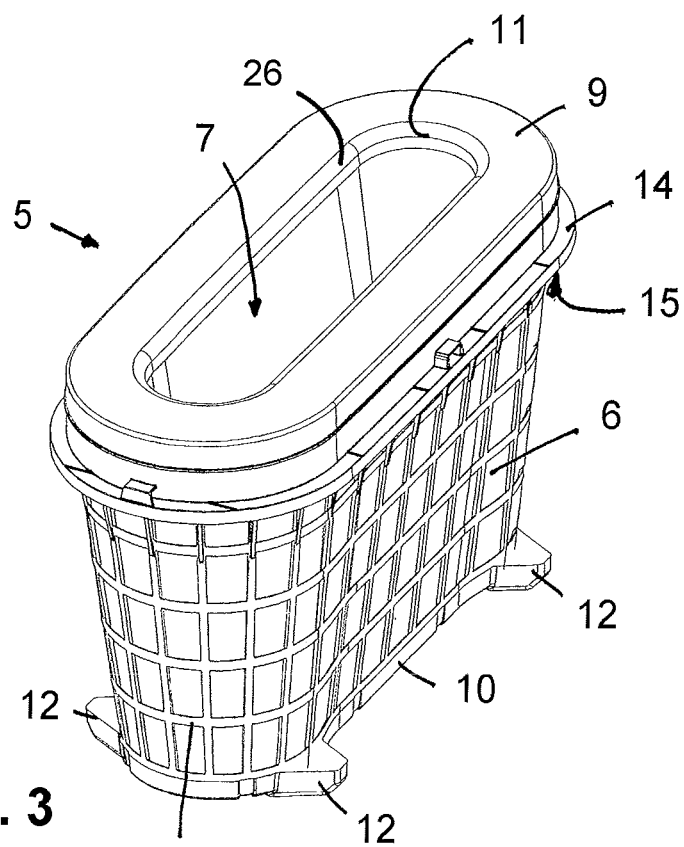
FIG. 3 is a perspective view of the filter element from above.
Figure 4:
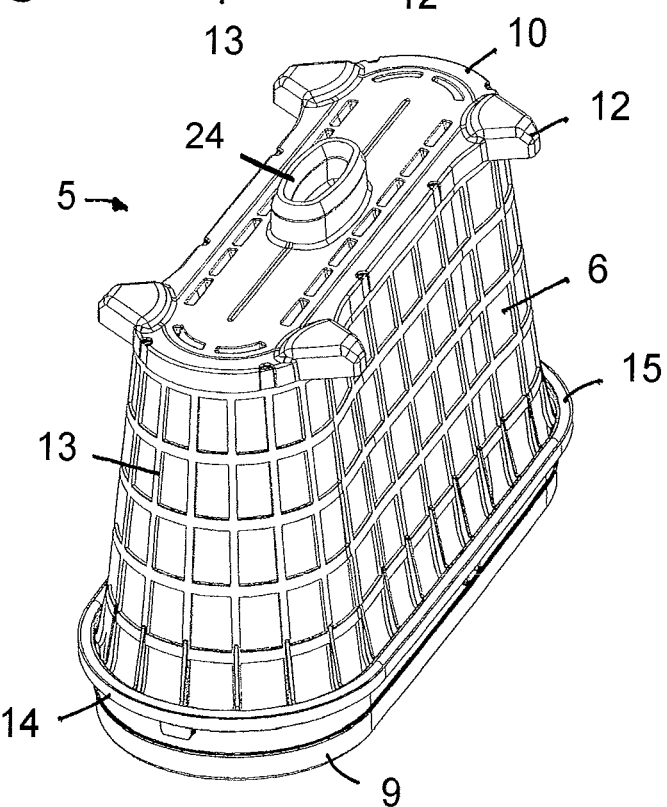
FIG. 4 is a perspective view of the filter element from below.

The filter element 5, as can be seen in FIGS. 1, 3, and 4, is provided with a filter medium body 6 where the filtration of the fluid to be purified is taking place. The filter element 5 is configured as a round filter element so that correspondingly the filter medium body 6 is also embodied as a round element that surrounds an inwardly positioned flow space 7 into which the fluid to be purified is introduced. The fluid is introduced axially, relative to the longitudinal axis 8 of the filter element 5 and the filter device 1 (FIG. 1), into the flow space 7. Subsequently, the fluid flows through the wall of the filter medium body 6 in radial direction from the interior to the exterior. Accordingly, the inner wall of the filter medium body 6 is the raw side and the outer wall is the clean side.

The filter element 5 and the filter medium body 6 comprise a strongly ovalized shape with two parallel extending long sides and semicircular narrow sides. Also, the filter element 5 has a conical basic shape where the axially oppositely positioned end faces of the filter element 5 are of a different size and have an outer circumference of a different size. The axial end faces of the filter medium body 6 are covered by a respective end disk 9, 10 in a fluid-tight way, wherein the end disk 9 at the larger end face of the filter element 5 is open and comprises a flow opening 11 through which the raw fluid can flow into the inwardly positioned flow space 7. The oppositely positioned end disk 10, on the other hand, is closed, as can be seen in FIG. 4, so that the inwardly positioned flow space 7 is also axially closed at this side.

At the closed end disk 10, cams 12 are integrally formed which extend radially in outward direction and are positioned at the long sides adjacent to the narrow sides. The cams 12 which are formed as one piece together with the end disk 10 support the filter element 5 in the mounted state at the filter housing base 3. In radial direction, the cams 12 do not project farther than the oppositely positioned larger end disk 9.

At the outer wall of the filter medium body 6, there is a support grid 13 which is in particular made of plastic material and is embodied separate from the end disks 9 and 10. The support grid 13 supports the filter medium body at its outer wall in radial direction. Due to the radial flow through the filter medium body 6 from the interior to the exterior, a pressure oriented outwardly is produced in the filter medium body which is absorbed by the support grid 13. This ensures that the filter medium body 6 is not deformed by the pressure of the fluid flowing through it.

Adjacent to the end disk 9 provided with the flow opening 11 for introducing the raw fluid, there is a seal carrier 14 that carries a sealing element 15. The seal carrier 14 is designed as a circumferentially extending carrier wall which is positioned in a plane orthogonal to the longitudinal axis 8 and is preferably embodied as one piece together with the support grid 13. The seal carrier 14 is arranged at a minimal axial spacing relative to the top end disk 9 and at a significantly greater axial spacing relative to the bottom end disk 10. The outer circumference of the seal carrier 14 has a greater radial extension than the outer wall of the filter medium body 6.

The sealing element 15 is designed as a sealing ring that is preferably inserted into a receiving groove in the end face of the carrier wall of the seal carrier 14 at the side which is facing away from the neighboring end disk 9. The sealing element 15 is facing away from the nearest end disk 9 and is facing the oppositely positioned end disk 10 and, in the mounted state, is resting on a circumferential shoulder 16 (FIG. 1) at the inner wall of the receiving filter housing base 3. The shoulder 16 is positioned axially at a spacing relative to the upper end face edge of the filter housing base 3.

Figure 5:
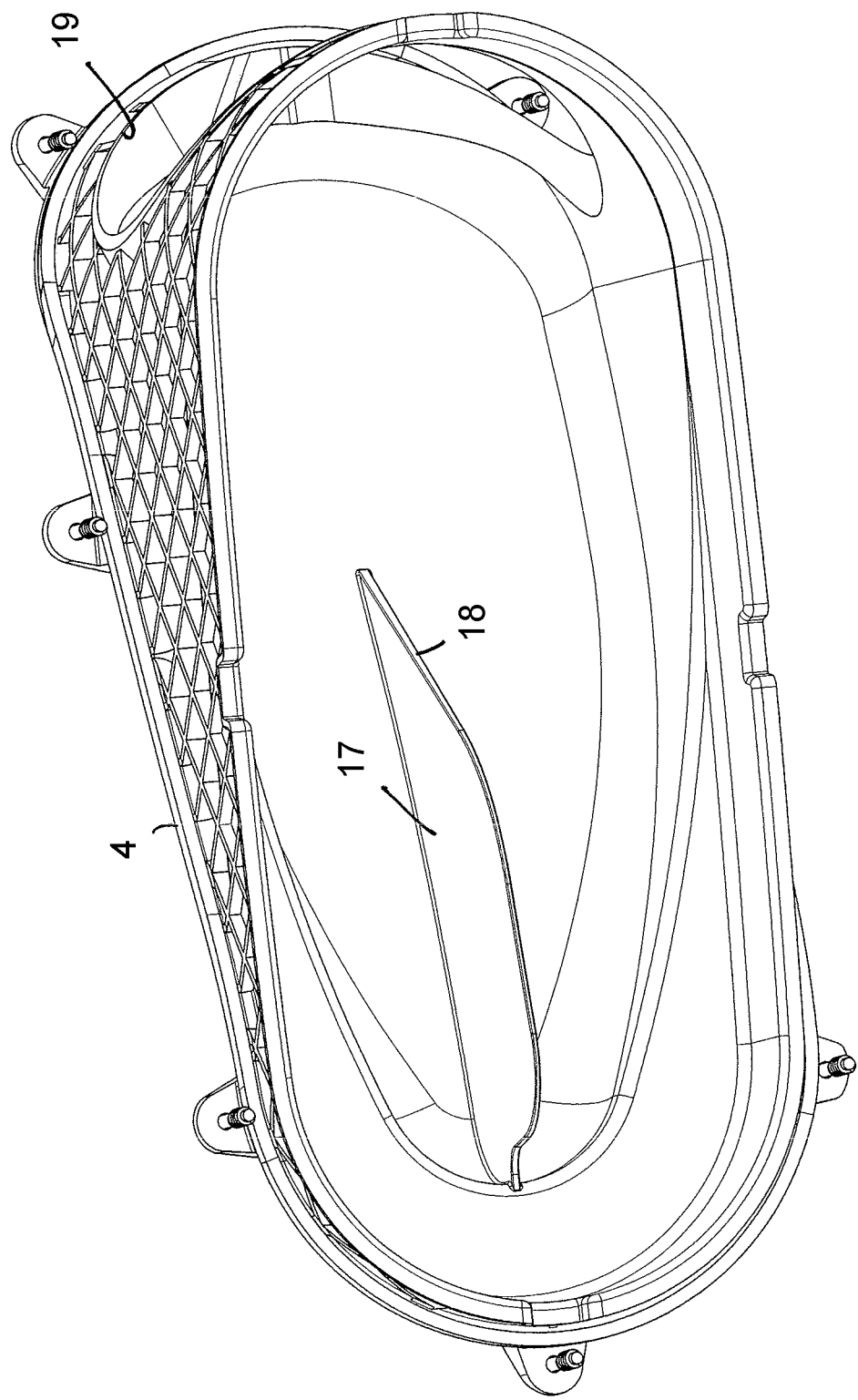
FIG. 5 shows an interior view of the housing cover, with a flow guiding rib at the inner side of the housing cover.
Figure 6:
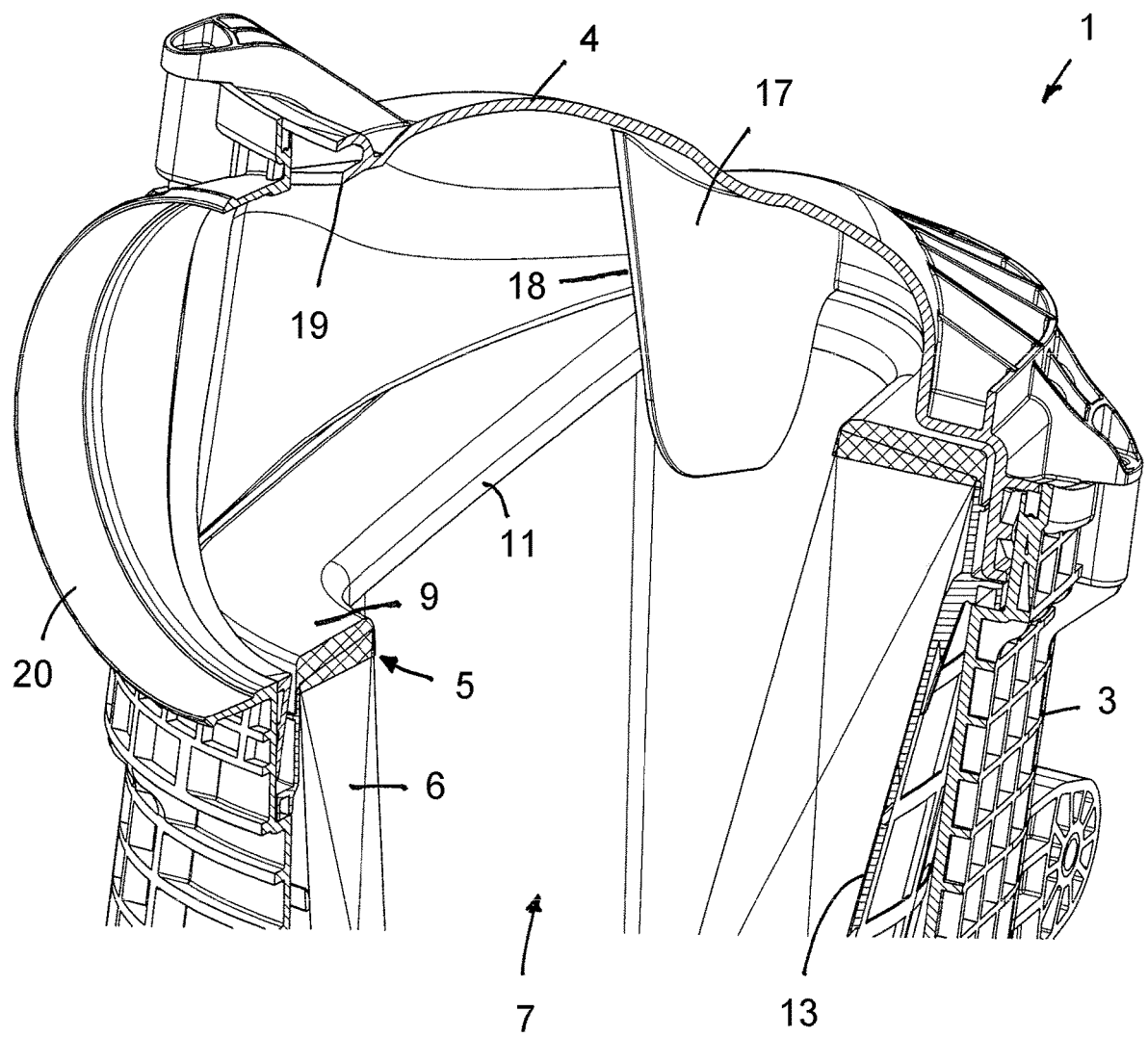
FIG. 6 shows in perspective view a section through the filter device in the region of the housing cover.
Figure 7:
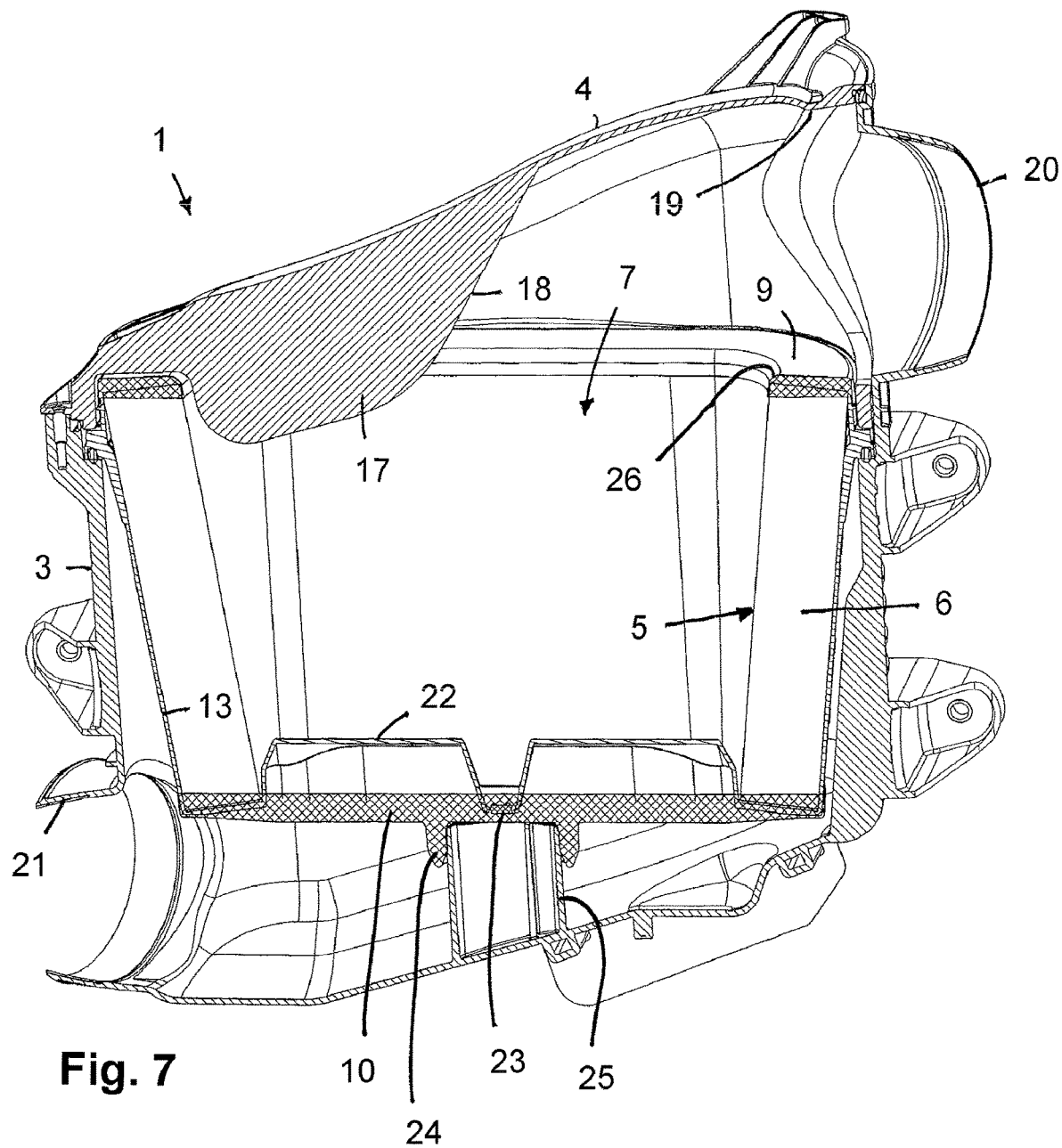
FIG. 7 shows a further section view of the filter device.

The following explanations concern the housing cover 4 which comprises at its inner side a blade-shaped flow guiding rib 17 (FIGS. 5, 6, 7). The flow guiding rib 17 is in particular straight and positioned in a plane and extends in the mounted state, as shown in FIGS. 6 and 7, axially into the inwardly positioned flow space 7 inside the filter element 5. The flow guiding rib 17 is embodied as one piece together with the housing cover 4.

A lateral inflow opening 19 is provided in the housing cover 4 through which the raw fluid flows radially into the filter device. The inflow opening 19 in the housing cover 4 corresponds with a further inflow opening 20 provided in the filter housing base 3. When the housing cover 4 is attached, the inflow openings 19 and 20 lie on top of each other so that a continuous flow path for the raw fluid is formed. The end face 18 of the flow guiding rib 17 is facing the inflow opening 19 in the housing cover 4. The flow guiding rib 17 is in particular positioned centrally at the inner side of the housing cover 4 so that the radially supplied raw fluid is divided by the blade-shaped flow guiding rib 17 and also experiences an improved axial flow conveyance in the direction of the inwardly positioned flow space 7 inside the filter medium body 6.

Figure 2:
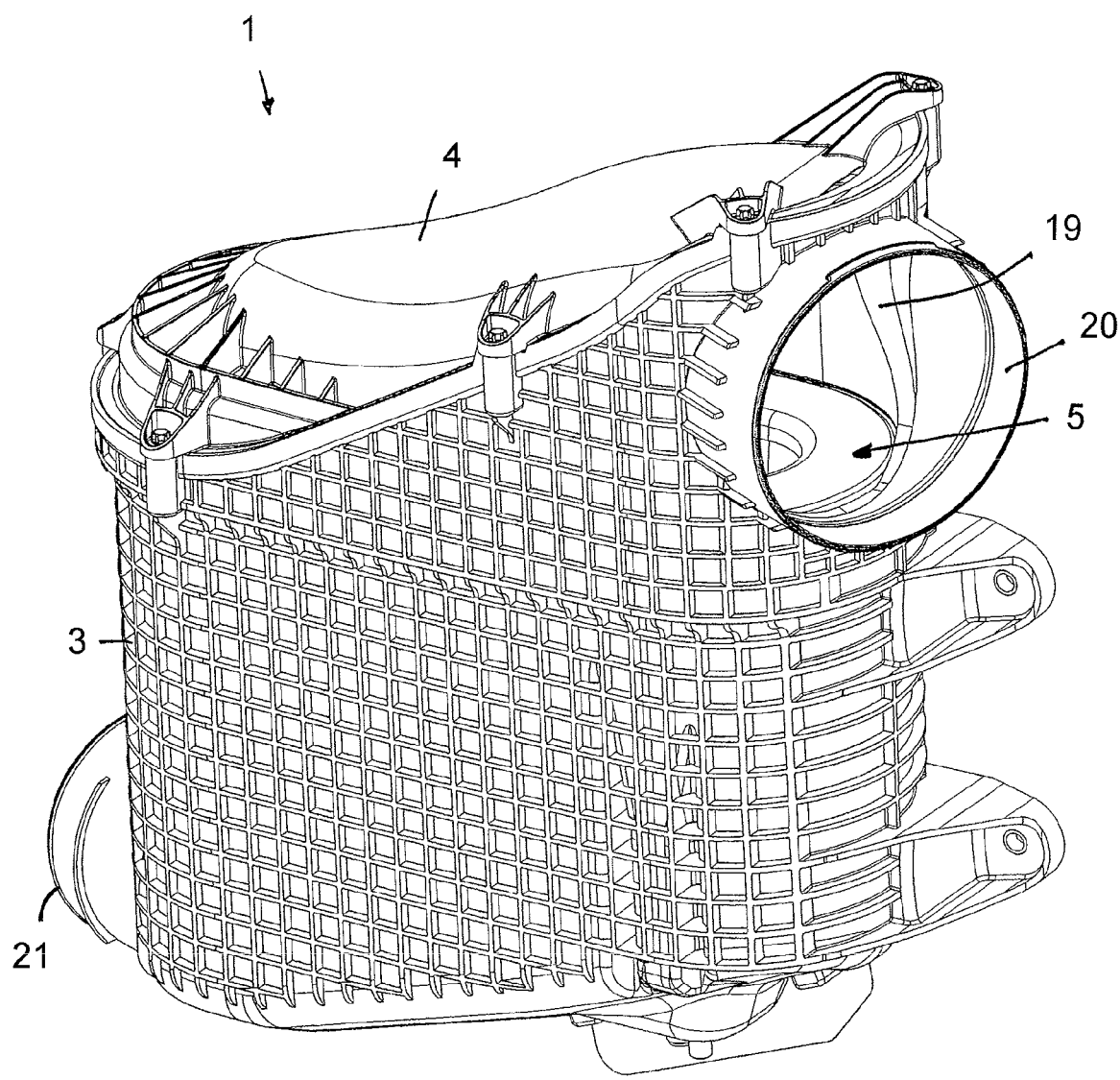
FIG. 2 shows in perspective view the filter device in the mounted state.

As shown in FIGS. 1, 2, and 7, there is a lateral radial outflow opening 21 for discharging the purified fluid provided at the filter housing base 3. The longitudinal flow axes of the inflow openings 19 and 20, on the one hand, and of the discharge opening 21, on the other hand, extend at least approximately parallel. The plane of the flow guiding element 17 can also extend approximately parallel to the longitudinal flow axes of inflow openings and outflow opening, even though also embodiments with non-parallel arrangement of the flow guiding element 17 relative to the openings 19, 20, and 21 as well as between the inflow openings 19 and 20 and outflow opening 21 are possible.

As can be seen in FIG. 7, in the bottom region of the filter element 5, adjacent to the bottom end disk 10, a shaped body 22 is provided that is in particular formed as one piece together with the support grid 13. The shaped body 22 projects axially into the inwardly positioned flow space 7 inside the filter medium body 6 and provides for a stabilization of the filter medium body 6 which is embodied as a folded filter. The shaped body 22 tapers toward its open end face in a wedge shape and comprises in the central region a lowered support sleeve 23 that projects into the bottom end disk 10. The radially outwardly positioned sections of the shaped body 22 also project into the end disk 10 whereby a fixed connection between the shaped body 22 and the bottom end disk 10 is achieved. The shaped body 22 is at least substantially of a straight configuration and extends in longitudinal direction of the filter medium body 6. The radially outwardly positioned sections of the shaped body 22 are connected to the support grid 13 so that supporting and holding forces are absorbed by the shaped body 22 and the bottom end disk 10 is relieved.

As can be seen in FIG. 7 in connection with FIG. 4, an annular support part 24 with which the filter element 5 can be placed onto a housing-associated support sleeve 25 is integrally formed centrally on the bottom end disk 10 at the side which is axially facing away from the inwardly positioned flow space 7. The support sleeve 25 is located at the bottom of the filter housing base 3. The annular support part 24 has an elongate cross section shape.

As can be seen also in FIG. 7, the inflow openings 19 and 20 are positioned in such a way that the end face of the top end disk 9 forms a continuous contour at the same level with the inflow openings 19 and 20. The downward inner side of the inflow openings 19 and 20 is located axially at the same level as the outwardly positioned end face of the top end disk 9. In this way, an obstacle-free inflow of the raw fluid is ensured.

As can be seen in FIG. 7 in connection with FIG. 3, the top end disk 9 is provided at its radially inwardly positioned side facing the central opening with a rounded portion 26 which facilitates inflow of the raw fluid into the inwardly positioned flow space 7. The radius of the rounded portion 26 at the radial inner side of the end disk 9 is greater than at the radial outer side of the end disk 9.

Figure 8:
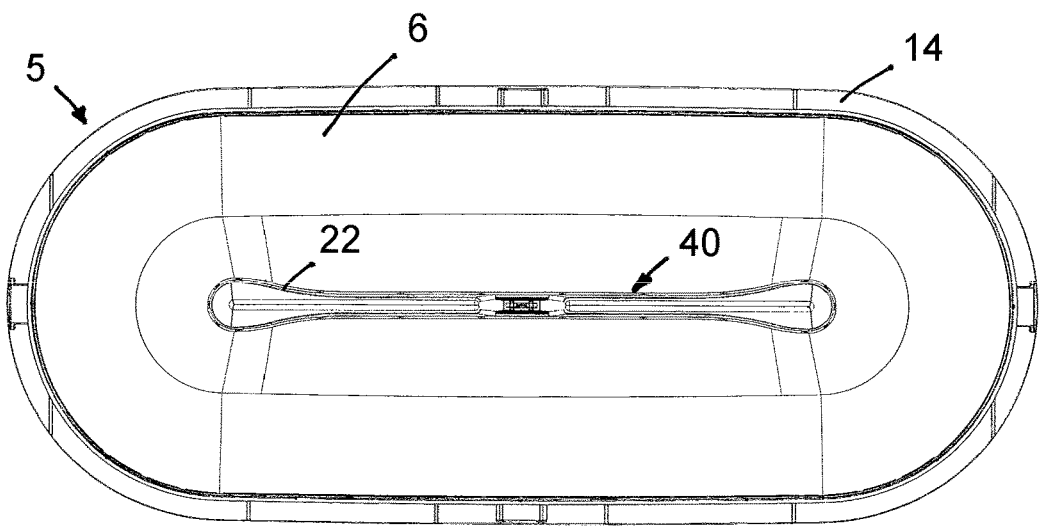
FIG. 8 is a plan view of a filter element whose narrow end face comprises radially inwardly oriented constrictions.
Figure 9:
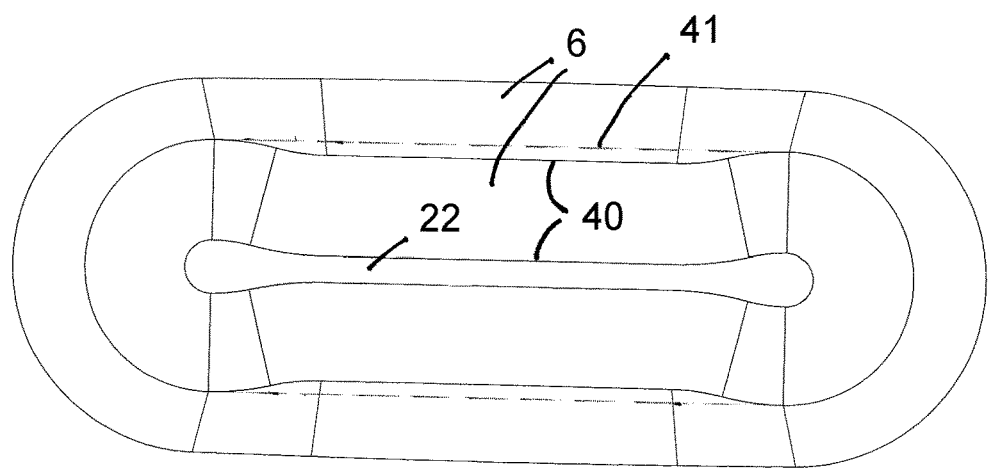
FIG. 9 shows the filter element without support grid in a view from below.
Figure 10:
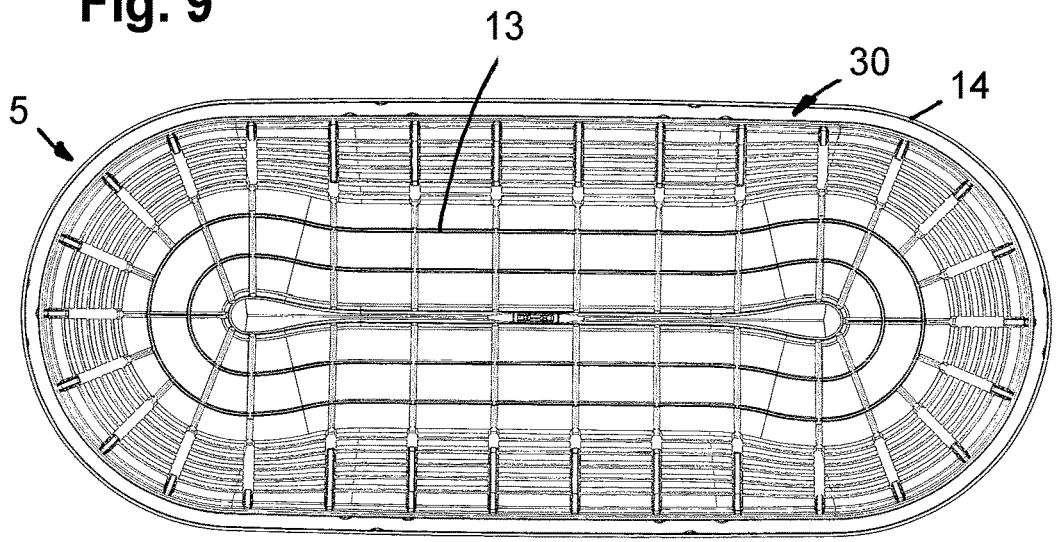
FIG. 10 shows the filter element with support grid and seal carrier in a view from below.

In FIGS. 8 to 10, a filter element 5 whose filter medium body 6 has a radial constriction 40 in the region of the narrow end face is shown in a plan view and a view from below. The constriction 40 is located at each one of the oppositely positioned long sides of the filter medium body 6 and concerns only the long sides but not the semicircular narrow sides of the filter medium body.

In FIG. 9, a connecting line 41 between the oppositely positioned narrow sides is shown in dashed lines relative to which the constriction 40 is displaced inwardly in radial direction. The long sides in the region of the constrictions 40 are of a straight configuration and have a constant radial spacing relative to the connecting line 41. The long sides comprise transition sections for passing into the semicircular narrow sides which have a greater radial extension.

The filter medium body 6 comprises constrictions 40 at the radial inwardly positioned side as well as at the radial outwardly positioned side in the region of the narrow end face so that the filter medium body has a constant thickness along each long side. The outer contour of the shaped body 22 which projects at the narrow end face into the interior inside the filter medium body 6 follows the contour of the filter medium body at this side with the radial constriction.

As can be seen in FIGS. 3 and 4 in connection with FIG. 10, the support grid 13 has also a corresponding contour with radial constrictions at the bottom end face with the end disk 10. The radial inwardly oriented constriction 40 extends in axial direction across at least half of the total height of the filter medium body 6, as needed across at least 80% of the total height. In the region of the top end disk 9 the filter medium body 6 has no such radial constriction, on the other hand. At the level of the seal carrier 14 which is positioned at an axial spacing relative to the nearest end disk 9, the filter medium body 6 has no longer a radial constriction at the long sides.

As also shown in FIG. 10, a receiving groove 30 for receiving a circumferentially extending sealing element is provided at the bottom side of the seal carrier 14.

Figure 11:
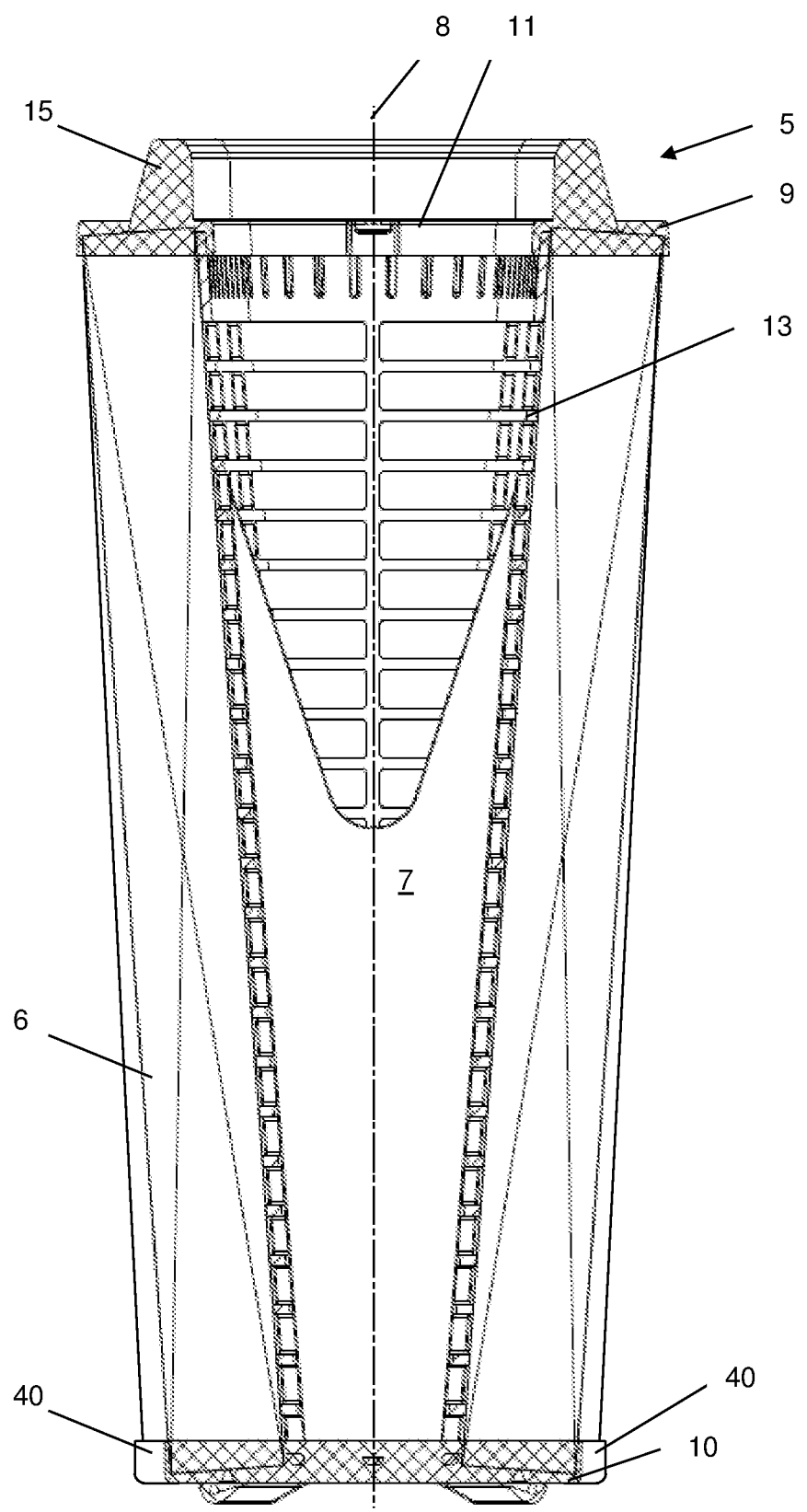
FIG. 11 is a longitudinal section view of an alternative embodiment of a filter element.

FIG. 11 shows schematically a longitudinal section view of an alternative embodiment of a filter element 5 which is configured preferably for flow from the exterior to the interior. Functionally identical elements are provided with same reference characters. The section extends along the longitudinal axis 8 transverse to the long sides of the filter medium body 6 in the region of the constrictions 40 which correspondingly can be seen at the closed bottom end disk 10. It is conceivable to design the constrictions 40 more pronounced, in particular maximally so far that the support grid at the level of the closed end disk 10 in the region of the constrictions 40 tapers to a point. Also, it can be seen that in the region of the open top end disk 9 no constriction is existing. Correspondingly, the support grid 13 is arranged radially within the filter medium body 6 in order to support and to stabilize it relative to the flow through it. The support grid 13 is embedded at both ends in the end disks 9 and 10. The sealing element 15 in this embodiment is embodied as one piece together with the open end disk 9, in the present case, as is preferred, of polyurethane or polyurethane foam which is cast in a casting mold. Preferably, the closed end disk 10 is produced in the same way. The sealing element 15 is projecting as an annular sealing bead axially away from the end disk 9 or the end face of the filter medium body 6 and surrounds the flow opening 11. The radial inner wall of the sealing element 15 forms the radial seal surface. The cross sections of the end disks 9, 10 and of the filter medium body 6 are embodied in analogy to the FIGS. 8 through 10.

What is claimed is:

1. An air filter element comprising:
a filter medium body embodied as an annularly closed folded filter and comprising a wall configured to be flowed through by a fluid to be purified in a radial direction relative to a longitudinal axis of the filter medium body;
the filter medium body comprising a first end face and an oppositely positioned second end face;
the filter medium body comprising an elongate cross section shape comprising two oppositely positioned narrow sides and two oppositely positioned long sides connecting the two narrow sides, wherein a cross section surface of the filter medium body tapers from the first end face toward the second end face and the second end face is narrower than the first end face;

the two long sides each comprising an inwardly oriented radial constriction in a region of the second end face, wherein, in a region of the first end face, the two long sides are formed without or at least approximately without the inwardly oriented radial constriction, respectively.

2. The air filter element according to claim 1, wherein the two narrow sides are semicircular and the two long sides are straight and comprise the inwardly oriented radial constriction in the region of the second end face.

3. The air filter element according to claim 1, wherein the radially inwardly oriented constrictions are straight or concave.

4. The air filter element according to claim 1, wherein a spacing between the inwardly oriented radial constrictions of the two long sides is constant.

5. The air filter element according to claim 1, wherein the radially inwardly oriented constrictions each extend axially at least across half of a total height of the filter medium body.

6. The air filter element according to claim 1, wherein the radially inwardly oriented constrictions each extend across an entire length of the two long sides.

7. The air filter element according to claim 1, further comprising a shaped body projecting into the second end face of the filter medium body.

8. The air filter element according to claim 7, further comprising a support grid arranged at the wall of the filter medium body, wherein the shaped body is arranged at the support grid.

9. The air filter element according to claim 8, wherein the support grid is arranged externally on the wall of the filter medium body.

10. The air filter element according to claim 7, wherein an outer contour of the shaped body corresponds to an outer contour of the filter medium body at the second end face.

11. The air filter element according to claim 1, wherein the folded filter comprises filter folds extending at least approximately in the radial direction.

12. A filter device comprising:
an air filter element according to claim 1; and
a filter housing for receiving the air filter element.

13. The filter device according to claim 12, wherein the filter housing comprises a filter housing base and an attachable housing cover, wherein the filter housing base has an at least approximately unchanged cross section surface across a height of the filter housing base.

14. An air filter element comprising:
a filter medium body comprising a wall configured to be flowed through by a fluid to be purified in a radial direction relative to a longitudinal axis of the filter medium body;

the filter medium body comprising a first end face and an oppositely positioned second end face, wherein a cross section surface of the filter medium body tapers from the first end face toward the second end face and the second end face is narrower than the first end face;

the filter medium body comprising an elongate cross section comprising two long sides;

the two long sides each comprising an inwardly oriented radial constriction in a region of the second end face, wherein, in a region of the first end face, the two long sides are formed without or at least approximately without the inwardly oriented radial constriction, respectively.

15. The air filter element according to claim 14, wherein narrow sides of the elongate cross section are semicircular and the two long sides are straight and comprise the inwardly oriented radial constriction in the region of the second end face.

16. The air filter element according to claim 14, wherein the radially inwardly oriented constrictions are straight or concave.

17. The air filter element according to claim 14, wherein a spacing between the inwardly oriented radial constrictions of the two long sides is constant.

18. The air filter element according to claim 14, wherein the radially inwardly oriented constrictions each extend axially at least across half of a total height of the filter medium body.

19. The air filter element according to claim 14, wherein the radially inwardly oriented constrictions each extend across an entire length of the two long sides.

20. The air filter element according to claim 14, further comprising a shaped body projecting into the second end face of the filter medium body.

21. The air filter element according to claim 20, further comprising a support grid arranged at the wall of the filter medium body, wherein the shaped body is arranged at the support grid.

22. The air filter element according to claim 21, wherein the support grid is arranged externally on the wall of the filter medium body.

23. The air filter element according to claim 20, wherein an outer contour of the shaped body corresponds to an outer contour of the filter medium body at the second end face.

24. A filter device comprising:
an air filter element according to claim 14; and
a filter housing for receiving the air filter element.

25. The filter device according to claim 24, wherein the filter housing comprises a filter housing base and an attachable housing cover, wherein the filter housing base has an at least approximately unchanged cross section surface across a height of the filter housing base.

\* \* \* \* \*